(12) United States Patent
Schwartz et al.

(10) Patent No.: US 7,710,575 B2
(45) Date of Patent: May 4, 2010

(54) SOLID-STATE LASER GYRO HAVING ORTHOGONAL COUNTERPROPAGATING MODES

(75) Inventors: Sylvain Schwartz, Paris (FR); Gilles Feugnet, Palaiseau (FR); Jean-Paul Pocholle, La Norville (FR); Augustin Mignot, Paris (FR); Bastien Steinhausser, Bures sur Yvette (FR)

(73) Assignee: Thales (FR)

( * ) Notice: Subject to any disclaimer, the term of this patent is extended or adjusted under 35 U.S.C. 154(b) by 35 days.

(21) Appl. No.: 12/097,367

(22) PCT Filed: Dec. 7, 2006

(86) PCT No.: PCT/EP2006/069449

§ 371 (c)(1),
(2), (4) Date: Jun. 13, 2008

(87) PCT Pub. No.: WO2007/068654

PCT Pub. Date: Jun. 21, 2007

(65) Prior Publication Data

US 2009/0116031 A1 May 7, 2009

(30) Foreign Application Priority Data

Dec. 13, 2005 (FR) .................................. 05 12604

(51) Int. Cl.
*G01C 19/64* (2006.01)
(52) U.S. Cl. ..................................................... 356/459
(58) Field of Classification Search ................. 356/459, 356/460
See application file for complete search history.

(56) References Cited

U.S. PATENT DOCUMENTS

| 4,420,258 A | * | 12/1983 | Burns et al. | .................. 356/460 |
| 4,955,034 A | * | 9/1990 | Scerbak | ........................ 372/94 |
| 6,426,795 B1 | | 7/2002 | Wolter et al. | |

(Continued)

FOREIGN PATENT DOCUMENTS

FR 1546652 A 11/1968

(Continued)

OTHER PUBLICATIONS

U.S. Appl. No. 11/718,717, filed Oct. 26, 2005 is not yet published.

*Primary Examiner*—Tarifur Chowdhury
*Assistant Examiner*—Jonathon D Cook
(74) *Attorney, Agent, or Firm*—Lowe Hauptman Ham & Berner, LLP

(57) ABSTRACT

The field of the invention is that of solid-state laser gyros used in inertial control units. However, there are certain technical difficulties in producing laser gyros of this type that are due partly to the fact that the counterpropagating waves interfere with each other in the amplifying medium. A laser gyro according to the invention comprises at least one solid-state amplifying medium and an optical ring cavity comprising first optical means for imposing a first linear polarization state common to the two counterpropagating optical waves at the entrance and exit of the zone containing the amplifying medium and second optical means for imposing, within the amplifying medium, a second linear polarization state on the first optical wave and a third linear polarization state on the second optical wave, these polarization states being perpendicular. Thus, all the drawbacks associated with interference are eliminated.

11 Claims, 3 Drawing Sheets

U.S. PATENT DOCUMENTS

| | | |
|---|---|---|
| 7,230,686 B1 | 6/2007 | Schwartz et al. |
| 7,319,513 B2 | 1/2008 | Schwartz et al. |
| 2004/0202222 A1 | 10/2004 | Pocholle et al. |
| 2005/0068611 A1* | 3/2005 | Feron et al. ............ 359/333 |
| 2006/0256828 A1 | 11/2006 | Schwartz et al. |
| 2006/0285118 A1 | 12/2006 | Feugnet et al. |
| 2007/0223001 A1 | 9/2007 | Feugnet et al. |
| 2008/0037026 A1 | 2/2008 | Feugnet et al. |
| 2008/0043225 A1 | 2/2008 | Schwartz et al. |

FOREIGN PATENT DOCUMENTS

| | | |
|---|---|---|
| FR | 1546652 | 5/1970 |
| FR | 2863702 A | 6/2005 |
| JP | 62088385 A1 | 4/1987 |
| WO | 2004094952 A1 | 11/2004 |
| WO | 2005066586 A1 | 7/2005 |

* cited by examiner

SOLID-STATE LASER GYRO HAVING ORTHOGONAL COUNTERPROPAGATING MODES

CROSS-REFERENCE TO RELATED APPLICATIONS

The present Application is based on International Application No. PCT/EP2006/069449, filed on Dec. 7, 2006, which in turn corresponds to French Application No. 0512604 filed on Jan. 15, 2007, and priority is hereby claimed under 35 USC §119 based on these applications. Each of these applications are hereby incorporated by reference in their entirety into the present application.

FIELD OF THE INVENTION

The field of the invention is that of solid-state laser gyros used notably in inertial control units. This type of equipment is used for example for aeronautical applications.

BACKGROUND OF THE INVENTION

The laser gyro, developed some 30 years ago, is widely used on a commercial scale at the present time. Its principle of operation is based on the Sagnac effect, which induces a frequency difference $\Delta\nu$ between the two optical transmission modes that propagate in opposite directions, called counterpropagating modes, of a bidirectional laser ring cavity undergoing a rotational motion. Conventionally, the frequency difference $\Delta\nu$ between the two optical modes induced by the rotational motion is equal to:

$$\Delta\nu = 4A\Omega/\lambda L$$

where L and A are the length and the area of the cavity, respectively; $\lambda$ is the laser emission wavelength excluding the Sagnac effect; and $\Omega$ is the rotation speed of the assembly. By measuring $\Delta\nu$, obtained by spectral analysis of the beat between the two emitted beams, it is possible to determine the value of $\Omega$ very accurately. A typical fringe counting device for laser gyros is used, based on the beat signal, to determine the relative angular position of the system.

In standard laser gyros, the amplifying medium is a gaseous medium of helium and neon atoms in appropriate proportions. However, the gaseous nature of the amplifying medium is a source of technical complications when producing the laser gyro, notably because of the high gas purity required and the premature wear of the cavity during its use due, in particular, to gas leakage and to deterioration of the high-voltage electrodes used to establish the population inversion.

It is possible to produce a solid-state laser gyro operating in the visible or near infrared using, for example, an amplifying medium based on crystals doped with ions of the rare earth type, such as neodymium, erbium or ytterbium, instead of helium/neon gas mixtures, the optical pumping then being provided by lasers diode operating in the near infrared. Thus, all the problems inherent with the gaseous state of the amplifying medium are de facto eliminated.

However, this type of laser gyro construction has certain technical difficulties partly due to the fact that the counterpropagating waves interfere within the amplifying medium.

This is because, if the amplifying medium is a crystalline solid of the Nd:YAG type, it can be demonstrated that, in such a medium, the population inversion gratings induced by stimulated emission in the gain medium have the effect of destabilizing the bidirectional emission. In addition, when the laser gyro is rotating, these gratings become moving gratings and induce, by the Doppler effect, a frequency shift between the two counterpropagating waves circulating in the laser cavity, thereby increasing the nonlinearity of the frequency response of the laser gyro.

It is also possible to use as amplifying medium a semiconductor with a vertical structure of the VECSEL (Vertical External Cavity Surface Emitting Laser) type. A VECSEL essentially comprises a stack of active quantum well zones constituting gain zones. For gyroscope applications, the use of a vertical structure is advantageous in so far as the gain zones may have a diameter of around 100 microns, close to the dimensions of the optical beam circulating in the cavity, also allowing propagation of the unguided wave. However, the use of such a device in transmission is excluded. This is because the active quantum well zones of the vertical structure must have a pitch equal to that of the grating formed by the interference between the two counterpropagating waves present in this structure so as to optimize the gain. When the laser gyro is rotating, the optical grating is not free to move as its maxima, also called antinodes, must remain within the gain zones. In this case, "gain-induced frequency locking" is obtained, which in fact makes the device unusable as a laser gyro.

SUMMARY OF THE INVENTION

The configurations according to the invention are particularly favorable for the operation of a crystalline solid-state laser gyro and if possible the operation of a laser gyro having a semiconductor amplifying medium of the VECSEL type used in transmission.

More precisely, one subject of the invention is a laser gyro comprising at least one ring-shaped optical cavity and a solid-state amplifying medium which are arranged so that first and second optical waves can propagate in opposite directions within the cavity, characterized in that the cavity comprises:
  first optical means for imposing a first linear polarization state common to the two counterpropagating optical waves outside the zone containing the amplifying medium; and
  second optical means for imposing, within the zone containing the amplifying medium, a second linear polarization state on the first optical wave and a third linear polarization state on the second optical wave, the third polarization state being perpendicular to the second polarization state.

Advantageously, the second means comprise two Faraday rotators, the first placed at the entrance of the amplifying medium and the second at the exit of the amplifying medium, the first providing a 45° rotation of a polarization state in a first direction and the second providing a 45° rotation of a polarization state in the opposite direction.

Advantageously, the laser gyro comprises means for periodically inverting the signs of the rotation angles of the Faraday rotators.

Advantageously, the first optical means comprise at least one linear polarizer. The first means may also comprise optical means for introducing a nonreciprocal optical phase shift between the two counterpropagating optical waves. The cavity may include means for measuring the temperature and means for changing the value of the phase shift according to the measurement of said temperature.

When necessary, the first optical means comprise a device for stabilizing the intensities in beat regime, as described for example in patent applications FR 03/03645 or FR 03/14598.

When necessary, optical devices exhibiting a reciprocal effect, such as wave plates or rotators, may be inserted into the cavity to minimize or eliminate the undesirable phase shift effects that may be induced by the mirrors of the laser cavity, as when the planes of polarization of the laser do not coincide with the s and p planes of the mirrors.

The amplifying medium may be a crystalline medium, for example of the Nd:YAG type, or a semiconductor medium with a vertical structure of the VECSEL type.

The invention also relates to an angular measurement or angular velocity measurement system comprising at least one laser gyro as described above. Advantageously, the system comprises three laser gyros, the cavities of which are oriented so as to carry out measurements in three independent directions.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
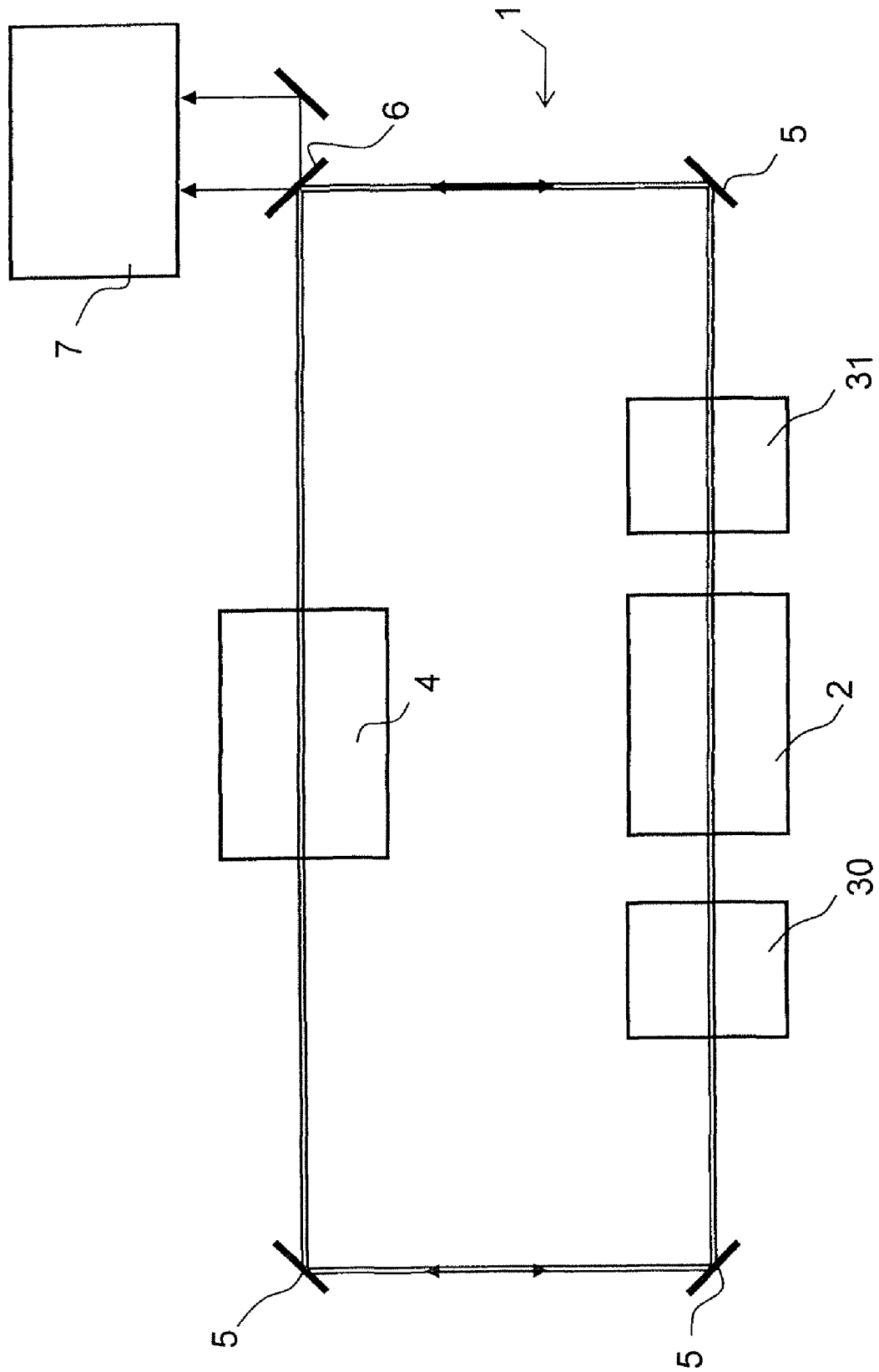
FIG. 1 shows a diagram of a laser gyro according to the invention.

FIG. 1 shows a diagram of a laser gyro according to the invention. It comprises essentially:

an optical ring cavity 1 consisting of mirrors 5 and a partially transparent plate 6;

a solid-state amplifying medium 2, the optical cavity and the amplifying medium arranged so that a first and second optical wave can propagate in opposite directions within the cavities;

first optical means 4 for imposing a first linear polarization state common to the two counterpropagating optical waves outside the zone containing the amplifying medium 2;

second optical means 30 and 31 for imposing, in the zone containing the amplifying medium and bounded by said elements 30 and 31, a second linear polarization state on the first optical wave and a third linear polarization state on the second optical wave, the third polarization state being perpendicular to the second polarization state; and a unit 7 for processing and analyzing the two counterpropagating waves for the inertial measurement.

To give an example, the second means 30 and 31 are optical rotators based on the nonreciprocal Faraday effect.

Figure 2:
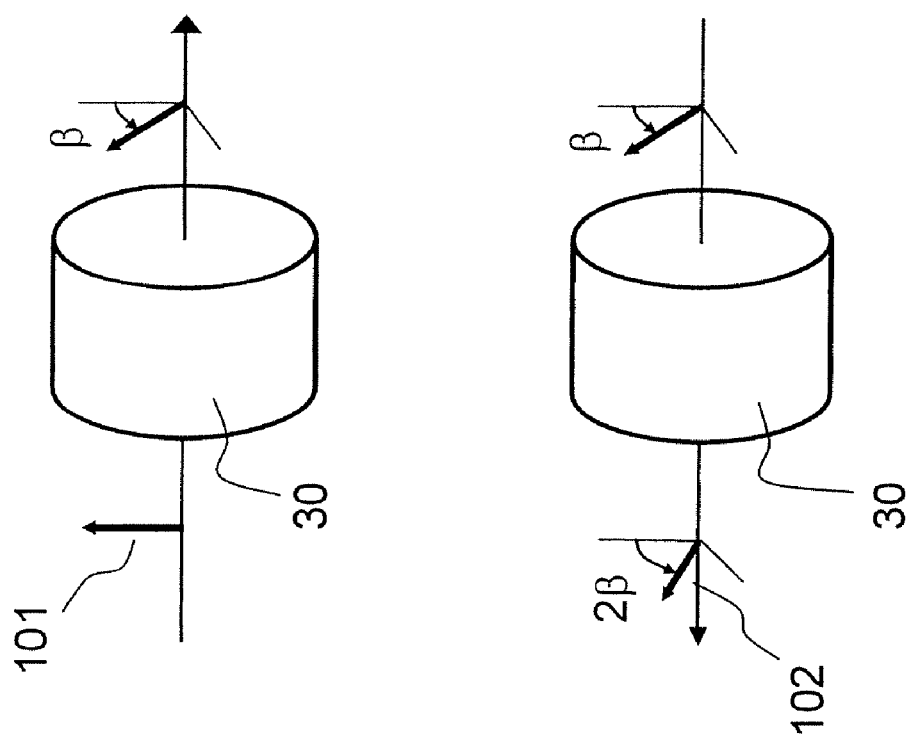
FIG. 2 shows the principle of an optical rotator based on the Faraday effect.

An optical rotation of the polarization of a wave is said to be "nonreciprocal" when the polarization rotation effects build up after one round trip of said wave in an optical component exhibiting this effect. The optical component is called an optical rotator based on the nonreciprocal effect. Materials exhibiting the Faraday effect have this particular feature. They are materials which, when subjected to a magnetic field, rotate the plane of polarization of the beams that pass through them. This effect is not reciprocal. Thus, the same beam entering in the opposite direction will undergo a rotation of its plane of polarization in the same direction. This principle is illustrated in FIG. 2. The direction of polarization of the linearly polarized beam 101 undergoes a rotation through an angle $\beta$ when it passes through the Faraday component 30 in the forward direction (the upper diagram in FIG. 2). If an identical beam 102 propagating in the opposite direction, and the polarization direction of which is initially rotated through $\beta$, is reinjected into the Faraday component, its polarization direction is again rotated through $\beta$ on passing through the component, the total rotation angle then being $2\beta$ after one round trip (lower diagram in FIG. 2).

Figure 3:
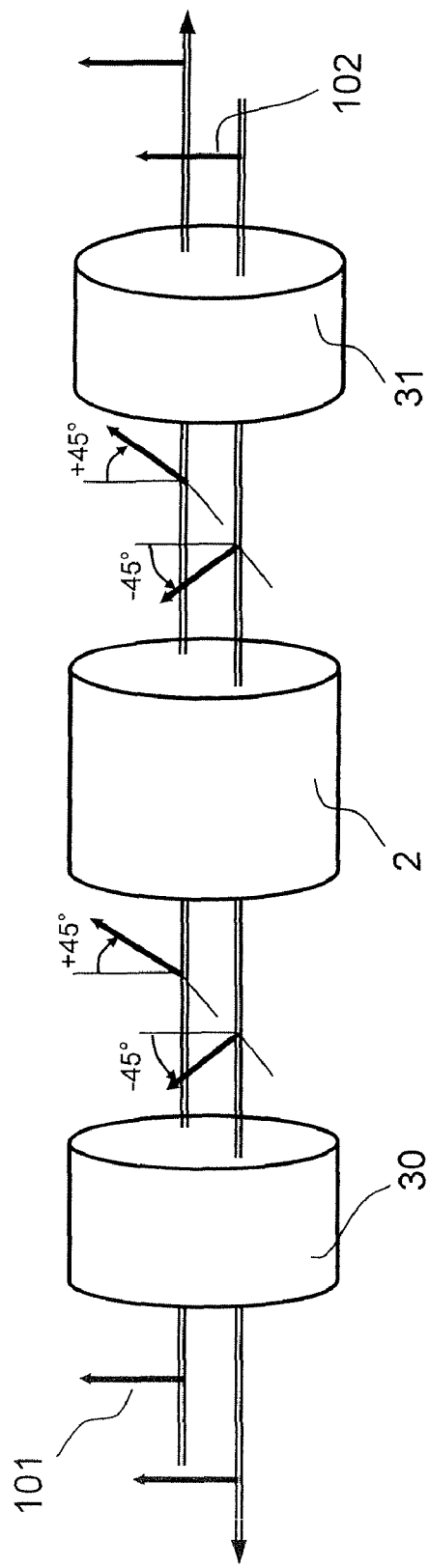
FIG. 3 shows the polarization states in the zone containing the amplifying medium.

As indicated in FIG. 3, the first rotator 30 is placed at the entrance of the amplifying medium 2 and the second rotator 31 is placed at the exit of the amplifying medium, the first rotator causing a 45° rotation of a polarization state in a first direction, the second rotator providing a 45° rotation of a polarization state in the opposite direction. To obtain this rotation inversion, it is sufficient for example for the rotators to be of equal length and for the modulus of the magnetic fields passing through them to be of equal magnitude but of opposite sign. This effect may be obtained using, for example, permanent magnets whose pulls are arranged in opposite directions or using induction coils through which currents of opposite sign pass.

When induction coils through which currents pass are used, the direction of the currents may advantageously be periodically reversed over time so as to make the average of certain nonreciprocal effects zero.

The linear polarization state of a wave 101 passing through the first rotator 30 undergoes a 45 degree rotation in a first direction and passes through the amplifying medium 2 with this inclination. The polarization state of this wave is rectified by the second rotator 31 and resumes its initial polarization direction. Conversely, the linear polarization state of a wave 102 entering in the opposite direction and passing through the second rotator 31 undergoes a 45 degree rotation in the opposite direction and passes through the amplifying medium with this inclination. Consequently, the two polarization states of the two waves are perpendicular within the amplifying medium 2. The polarization state of this second wave is rectified by the first rotator 30 and resumes its initial polarization direction.

Since the two polarization states are perpendicular, they cannot interfere with each other. Thus, all the drawbacks associated with such interference, such as the creation of population inversion gratings in the case of the crystalline solid state and the gain-induced locking in the case of VECSEL, are eliminated. The backscattering induced by the amplifying medium is also greatly attenuated by this device, thereby reducing the size of the blind zone.

Of course, in order for the device to operate correctly, it is important that, both at the entrance and the exit of the assembly formed by the two rotators and the amplifying medium, the polarization state of the two counterpropagating waves be linear and common to the two waves. For this purpose, the cavity of the laser gyro includes first optical means 4 for imposing such a state.

These first means may be a simple linear polarizer. These means may also fulfill other functions useful to the operation of a laser gyro. By way of nonlimiting example, mention may be made of the introduction of a nonreciprocal phase shift for eliminating or reducing the effects of the blind zone, this phase shift being accomplished by means of a Faraday rotator surrounded by two polarizers.

Depending on the configuration, phase shifts leading to undesirable changes to the polarization states of the laser may occur upon reflection off the mirrors of the laser cavity. This is for example the case when the incident polarizations do not lie in the S and P planes of the mirrors, S and P standing for "Senkrecht [Perpendicular]" and "Parallel" respectively. Optical devices exhibiting a reciprocal effect may in this case be used to correct the polarization states. To give a nonlimiting example, when the polarization state common to the two rotation directions in the zone not containing the gain medium is linear and lies in the S plane of the mirrors, the insertion of two half-wave plates, the axis of which is at 22.5° to the direction of the linear polarization state, makes it possible to obtain, in the zone containing the gain medium, crossed polarizations lying in the S and P planes of the mirrors, and not at 45° to these planes as would be the case without the use of these half-wave clips. This avoids any undesirable modification of the polarization state and makes it possible, in particular in this example, to place the two unreciprocal rotators in two different arms of the laser cavity.

To check that, in the configuration of the invention, the polarization eigenstates of the laser cavity propagating in opposite directions are orthogonal in the amplifying medium, the Jones matrix formula zone is used. This consists in representing the influence of a component on the polarization state by a 2×2 matrix referenced in a plane perpendicular to the propagation direction of the optical nodes. In general, the axes of the chosen reference frame correspond to the principal axes of an intracavity polarizer, thereby making the mathematical representation easier. To determine the resulting influence of the set of intracavity components, it is then sufficient to determine the eigenstates of the product of the various matrices representative of these components. This product is not necessarily the same in the two propagation directions. A symbol CW (clockwise) will denote a first propagation direction of the modes and CCW (counterclockwise) will denote the opposite propagation direction.

In the present case, the base composed of the eigenvector imposed by the first optical means and of a vector that is orthogonal to it is chosen. In this case, the matrix of the first means is expressed as:

$$E_{CW} = \begin{pmatrix} \lambda_{CW} & 0 \\ 0 & 0 \end{pmatrix}$$

in one propagation direction and $$E_{CCW} = \begin{pmatrix} \lambda_{CCW} & 0 \\ 0 & 0 \end{pmatrix}$$

in one opposite propagation direction.

The matrices corresponding to the Faraday rotators are independent of the direction of travel and are expressed as:

$$R(\pm 45°) = \frac{\sqrt{2}}{2} \begin{pmatrix} 1 & \pm 1 \\ \mp 1 & 1 \end{pmatrix}.$$

Consequently, the Jones matrix $M_{CW}$ of the set of elements present in the cavity is expressed in a first propagation direction CW as:

$$M_{CW} = R(+45°) \cdot E_{CW} \cdot R(-45°) = \frac{\lambda_{CW}}{2} \begin{pmatrix} 1 & -1 \\ -1 & 1 \end{pmatrix}$$

which gives, for the eigenvector in the amplifying medium:

$$V_{CW} = \frac{\sqrt{2}}{2} \begin{pmatrix} 1 \\ -1 \end{pmatrix}.$$

In the opposite direction CCW, the Jones matrix $M_{CCW}$ of the set of elements present in the cavity is expressed as:

$$M_{CCW} = R(-45°) \cdot E_{CCW} \cdot R(+45°) = \frac{\lambda_{CCW}}{2} \begin{pmatrix} 1 & 1 \\ 1 & 1 \end{pmatrix}$$

which gives for the eigenvector in the amplifying medium:

$$V_{CCW} = \frac{\sqrt{2}}{2} \begin{pmatrix} 1 \\ 1 \end{pmatrix}.$$

The vectors $V_{CW}$ and $V_{CCW}$ are therefore orthogonal, which is indeed the desired effect.

As mentioned, this arrangement makes it possible to eliminate the interference between the counterpropagating waves in the amplifying medium. There are many advantages:

- if the amplifying medium is a crystalline solid of the Nd:YAG type, the population inversion gratings induced by stimulated emission in the amplifying medium can no longer form, thereby eliminating one of the causes of instability of the bidirectional emission and the frequency shifts induced by said gratings when the laser gyro rotates;
- the backscattering in the gain medium is very greatly reduced;
- for certain amplifying media, the competition between the counterpropagating waves is also reduced. Advantageously, this may even be reduced to zero in certain cases, such as for example with the Nd:YAG cut along the (1, 1, 0) crystallographic axis. Of course, if this reduction proves to be insufficient to eliminate the competition between the two counterpropagating waves, it is always possible to introduce into the cavity a stabilizing device intended to guarantee bidirectional emission;
- when a phase-shifting device is present in the cavity in order to compensate for the effects of the blind zone, the phase angle introduced by this device may be corrected for a value dependent on the temperature of the cavity by means of a feedback control device coupled to a temperature sensor. For example, it is thus possible to compensate for the effects of the phase shift between the two modes induced by the birefringence in the gain medium; and thanks to the invention, it becomes possible to use as laser gyro a semiconductor amplifying medium having a vertical structure of the VECSEL type operating in transmission.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A laser gyro comprising at least one ring-shaped optical cavity and a solid-state amplifying medium which are arranged so that first and second optical waves can propagate in opposite directions within the cavity, wherein the cavity comprises:
    first optical means for imposing a first linear polarization state common to the two counterpropagating optical waves outside the zone containing the amplifying medium; and
    second optical means defining the zone containing the amplifying medium and for imposing, within this zone, a second linear polarization state on the first optical wave and a third linear polarization state on the second optical wave, these two polarization states being perpendicular;
    wherein the second means are two Faraday rotators, the first placed at the entrance of the amplifying medium and the second at the exit of the amplifying medium, the first providing a 45° rotation of a polarization state in a first direction and the second providing a 45° rotation of a polarization state in the opposite direction.

2. The laser gyro as claimed in claim 1, wherein the laser gyro comprises means for periodically inverting the signs of the rotation angles of the Faraday rotators.

3. The laser gyro as claimed in claim 1, wherein the first optical means comprise at least one linear polarizer.

4. The laser gyro as claimed in claim 1, wherein the cavity includes optical devices exhibiting a reciprocal effect.

5. The laser gyro as claimed in claim 1, wherein the first optical means comprise optical means for introducing a non-reciprocal optical phase shift between the two counterpropagating optical waves.

6. The laser gyro as claimed in claim 5, wherein the cavity includes means for measuring the temperature and means for changing the value of the phase shift according to the measurement of said temperature.

7. The laser gyro as claimed in claim 1, wherein the amplifying medium is a crystalline medium of the Nd:YAG type.

8. The laser gyro as claimed in claim 1, wherein the amplifying medium is a semiconductor medium with a vertical structure of the VECSEL type.

9. A system for angular measurement or angular velocity measurement, comprising at least one laser gyro as claimed in claim 1.

10. The measurement system as claimed in claim 9, comprising three laser gyros, the cavities of which are oriented so as to carry out measurements in three independent directions.

11. A laser gyro comprising at least one ring-shaped optical cavity and a solid-state amplifying medium which are arranged so that first and second optical waves can propagate in opposite directions within the cavity, wherein the cavity comprises:
    first optical means for imposing a first linear polarization state common to the two counterpropagating optical waves outside the zone containing the amplifying medium; and
    second optical means defining the zone containing the amplifying medium and for imposing, within this zone, a second linear polarization state on the first optical wave and a third linear polarization state on the second optical wave, these two polarization states being perpendicular;
    wherein the amplifying medium is a semiconductor medium with a vertical structure of the VECSEL type.

* * * * *